L. WILLIS.
SELF RELEASING POSITIVE CLUTCH.
APPLICATION FILED FEB. 11, 1915.

1,158,354.

Patented Oct. 26, 1915.
4 SHEETS—SHEET 2.

Witnesses
Hamilton S. Turner
Elsie Fullerton

Inventor
Leland Willis
by his Attorney
Harry Smith

L. WILLIS.
SELF RELEASING POSITIVE CLUTCH.
APPLICATION FILED FEB. 11, 1915.

1,158,354.

Patented Oct. 26, 1915.
4 SHEETS—SHEET 3.

Witnesses

Inventor
Leland Willis
by his Attorney

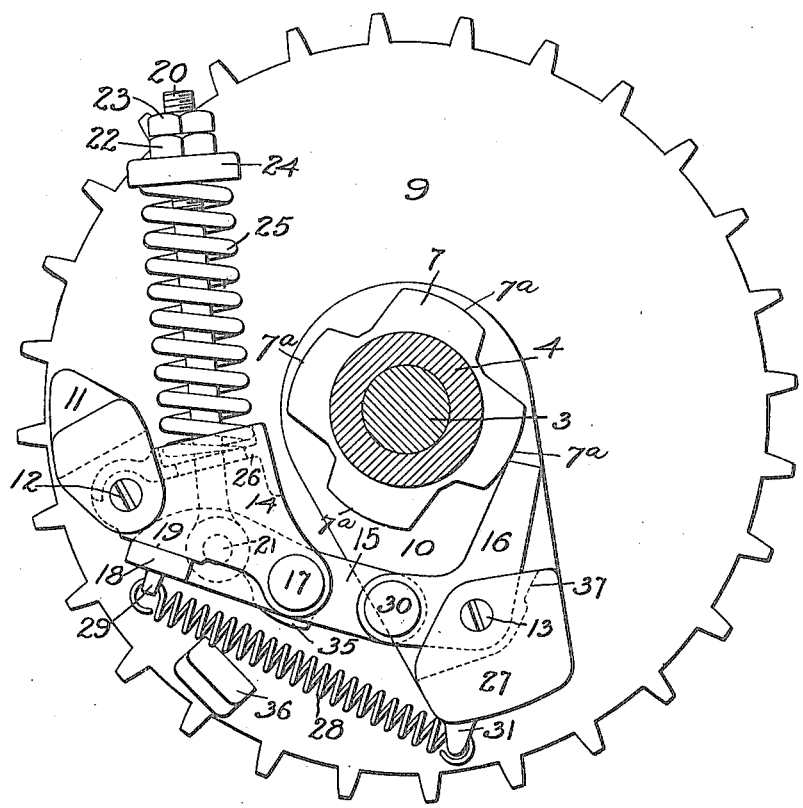

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

SELF-RELEASING POSITIVE CLUTCH.

1,158,354.  Specification of Letters Patent.  Patented Oct. 26, 1915.

Application filed February 11, 1915. Serial No. 7,549.

*To all whom it may concern:*

Be it known that I, LELAND WILLIS, a citizen of the United States, residing in Grenloch, New Jersey, have invented a Self-Releasing Positive Clutch, of which the following is a specification.

My invention consists of a positive drive clutch, that is to say one in which the members are positively engaged and cannot slip in respect to one another while in such engagement, the object of my invention being to so construct such a clutch that, when the forward movement of the driven member meets with a resistance which it cannot overcome, the engaging members of the clutch will be automatically disengaged and breakage of any of the parts thereby prevented. This object I attain in the manner hereinafter set forth, reference being had to the accompanying drawings, in which—

Figure 1:
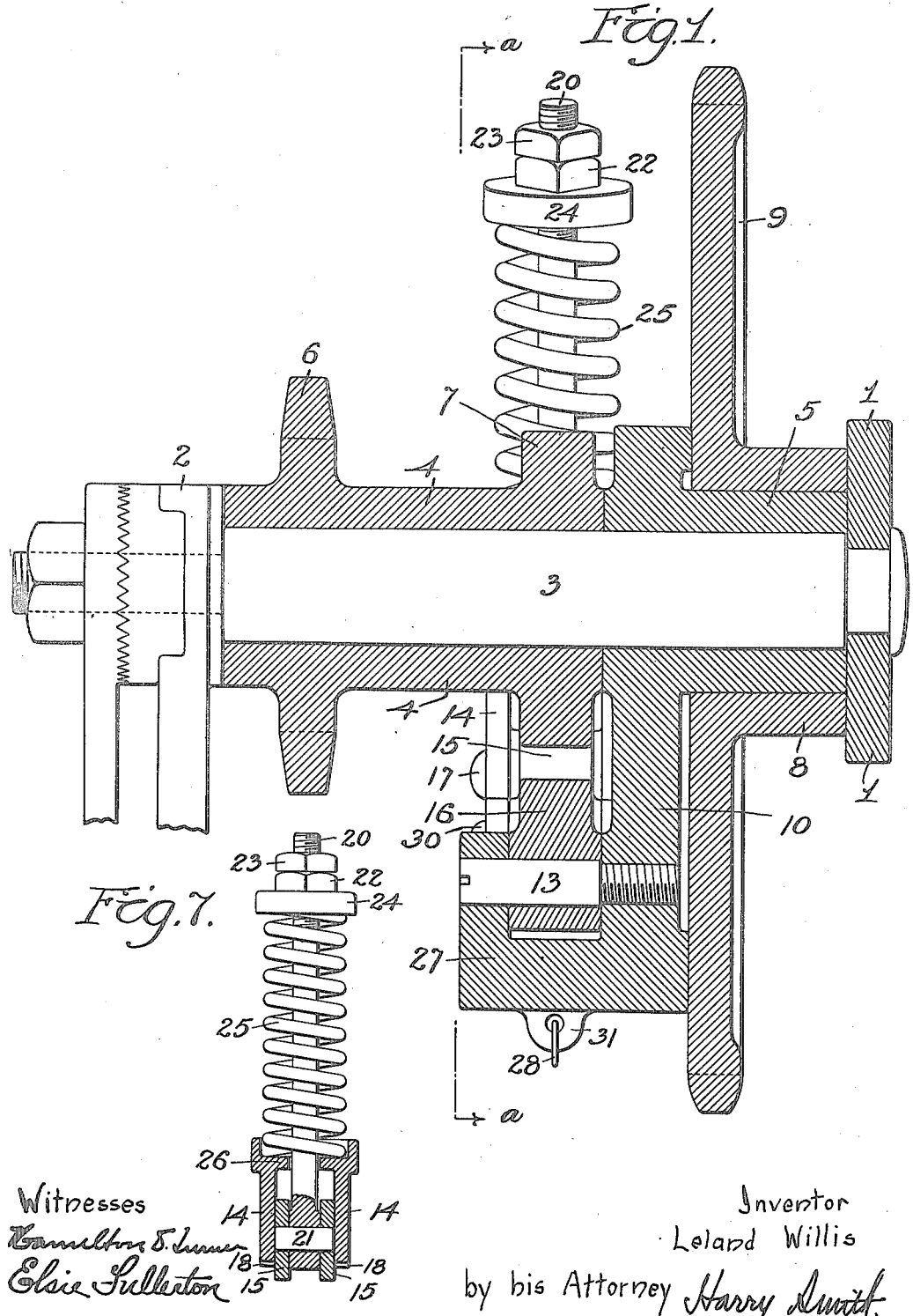
Figure 2:
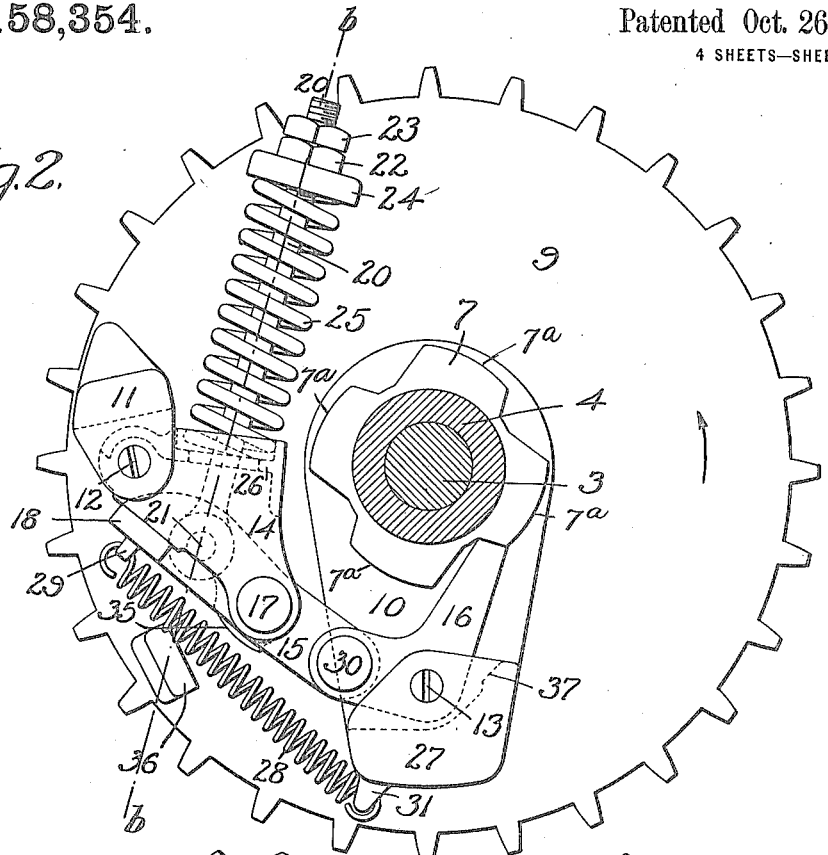

Figure 1 is a transverse sectional view showing the driving and driven elements of a machine equipped with a self-releasing positive clutch in accordance with my invention; Fig. 2 is a transverse section on the line a—a, Fig. 1, looking in the direction of the arrow there noted but on a smaller scale, this view showing the parts of the clutch in engagement with one another, as when power is being transmitted from the driving to the driven element; Figs. 3, 4, 5 and 6 are views similar to Fig. 2, but showing the different positions of the parts assumed during the operation of disengaging the members of the clutch from one another, and Fig. 7 is a transverse section on the line b—b, Fig. 2.

In Fig. 1 of the drawing, 1 and 2 represent parts of the fixed frame of a machine provided with power transmission mechanism in connection with which my improved clutch is employed. The frame of the machine carries a fixed shaft or axle 3 on which are mounted so as to be free to rotate a pair of sleeves 4 and 5, the sleeve 4 having secured to or formed in one piece therewith a spur wheel 6, or other machine element to which power is to be transmitted, and a ratchet 7 which constitutes one member of the clutch whereby the power is transmitted.

Free to turn on the sleeve 5 is the hub 8 of a spur wheel 9, or other machine element which constitutes a driving element and secured to or forming part of said sleeve 5 is a third element shown, in the present instance, as a hanger 10, which is free to move independently of both the driving element 9 and driven element 6, but normally rotates with said driving element 9. Secured to the face of the spur wheel 9 is a bracket 11 and between a bolt 12 carried by this bracket and a bolt 13 carried by the hanger 10 is interposed a toggle mechanism comprising a link 14 and two levers 15 and 16, the link 14 being pivoted at one end to the bolt 12 and carrying at its other end a pin 17 which constitutes a fulcrum for the lever 15, the bolt 13 constituting a fulcrum for the lever 16, and the forward arm of the lever 15 and the rearward arm of the lever 16 being pivotally connected by means of a bolt or pin 30.

The lever 16 is of the bell crank type, one of its arms being substantially at a right angle to the other, and constituting a pawl for engagement with the teeth of the ratchet 7, said pawl thus constituting the other member of the positive clutch interposed between the driving member 9 and driven member 6 of the device. The link 14 has inner and outer sides and the lever 15 is disposed between the same, the rear arm of the lever having on one or both sides a laterally projecting lug 18 which normally bears against a face 19 on the corresponding side of the link and thereby limits further movement of the lever 15 in that direction.

The head of a swinging bolt 20 is pivotally mounted upon a pin 21 carried by the rear arm of the lever 15, the outer end of said bolt 20 being threaded for the reception of an adjusting nut 22 and a lock nut 23, said adjusting nut bearing upon a cupped washer 24, which, in turn, bears upon the outer end of a coiled spring 25 surrounding the bolt 20 and seated at its inner end against a transverse web 26 which connects the inner and outer sides of the link 14, as shown in Fig. 7. The spring 25 and bolt 20 therefore serve to normally retain the members of the toggle mechanism in the driving position shown in Fig. 2, so that power can be transmitted from the bolt 12 to the hanger 10, and thence to the driven member of the clutch. The inner side of the link 14 extends downwardly below the outer side to a limited extent, as shown at 35 in Figs. 2 to 7, and at a certain stage in the operation of the device this projecting portion of the link 14 comes into contact with a lug 36 on the face of the wheel 9 which serves to arrest any further movement of the link in that direction.

In order to support the bolt 13, which constitutes the fulcrum for the lever 16, so as to enable said bolt to effectually resist the strains to which it is subjected the lower end of the hanger 10 is hooked, as shown in Fig. 1, and the lever 16 is interposed between the inner and outer members of the hook, the inner threaded portion of the bolt being screwed into the body of the hanger, as shown in Fig. 1, and the outer portion of the bolt, which projects beyond the lever 16, being supported by the outer member 27 of the hanger, as also shown in Fig. 1.

Between the inner and outer members of the hooked lower end of the hanger 10 is interposed a web presenting a surface 37 which serves to arrest the movement of the pawl 16 when the lever is being freed from engagement with the ratchet member 7 of the clutch. A coiled spring 28 is connected at one end to an ear 29 on the lever 15 and at the other end to an ear 31 on the hanger 10, the tendency of this spring being to constantly draw said ears 29 and 31 toward one another.

Figure 3:
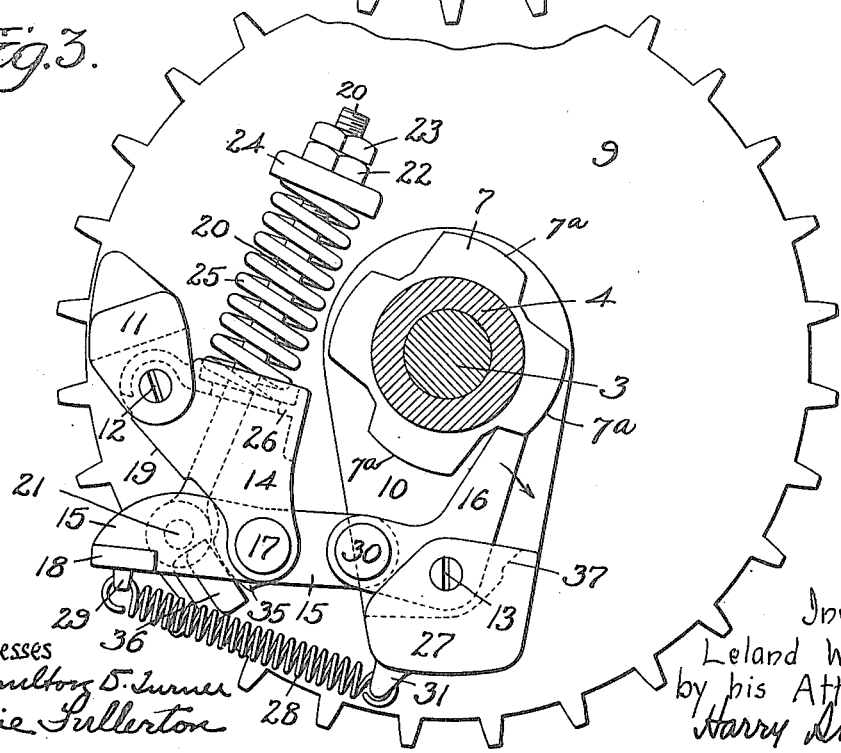
Figure 4:
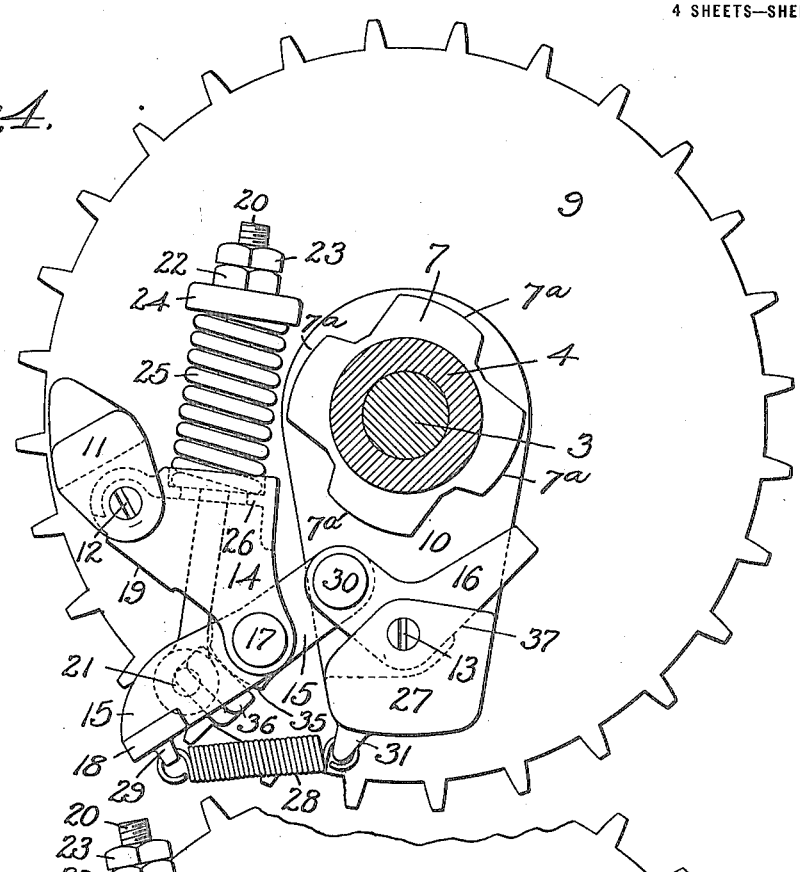

Supposing that the spur wheel 9 is rotating in the direction of the arrow shown in Fig. 2 and that the power transmitting devices are in the position shown in said figure, the pin 17 will be but slightly outward from a line drawn between the centers of the bolts 12 and 13 and the toggle mechanism will constitute a practically rigid connection between said bolts 12 and 13, the normal amount of power intended to be transmitted from the driving member 9 to the driven member 6 not being sufficient to cause the bending, or, as it is technically termed, the "breaking" of the toggle, and the hanger 10 will rotate in unison with the spur wheel 9, thereby causing the pawl 16 to likewise rotate the ratchet wheel 7 and spur wheel 6. If, however, the rotation of the spur wheel 6 or other driven member is obstructed to such an extent that the normal amount of power transmitted thereto is not sufficient to overcome the obstruction, the rotation of said spur wheel, and consequently of the ratchet 7 and hanger 10, will be arrested, but, as the rotation of the spur wheel 9 continues, the bolt 12 will approach the bolt 13 and thus cause the bending or "breaking" of the toggle mechanism intervening between said bolts. The first effect of this operation is to drive the pin 17 outwardly until the projecting portion 35 of the link 14 comes into contact with the stop lug 36 on the face of the spur wheel 9, as shown in Fig. 3, this movement also causing the lever 15 to swing upon the pin 30 so as to compress the spring 25, as also shown in Fig. 3. When the outward movement of the pin 17 is arrested by contact of the portion 35 of the link 14 with the stop lug 36, as shown in Fig. 3, the center of the connecting pin 30 between the levers 15 and 16 is above a line drawn through the centers of the pin 17 and bolt 13, hence continued movement of the bolt 12 toward the bolt 13 causes the bending or "breaking" of the toggle comprising the levers 15 and 16, and thus swings the pawl lever 16 upon its fulcrum 13 in the direction of the arrow Fig. 4, this movement continuing until it is arrested by the stop 37. At that time the pawl is free from engagement with the tooth of the ratchet 7 and the hanger 10 is free to move forwardly, consequently the spring 25 acts to restore the link 14 and lever 15 to the position shown in Fig. 5, the pawl lever 16 still retaining its former position because the pull of the spring 28 upon the lever 15 and hanger 10 acts to retain the center of the pin 30 inwardly beyond the line drawn through the centers of the pin 17 and bolt 13.

Figure 5:
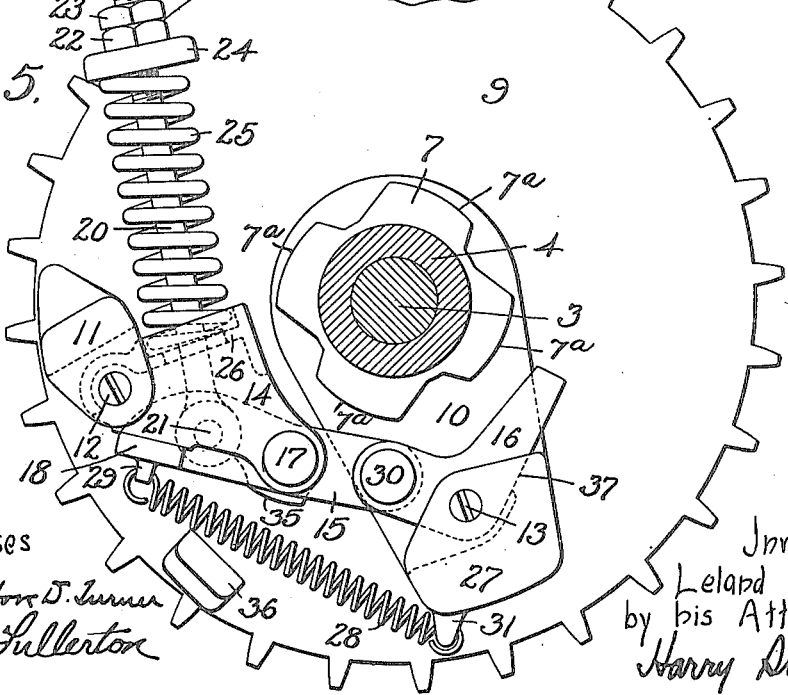

The parts retain the position shown in Fig. 5, and the hanger 10 rotates with the driving member 9 as long as the forward movement of the latter is continued, or at least until the obstruction to the forward movement of the driven member 6 is removed, whereupon the pawl lever 16 is moved by hand until the center of the pin 30 has been carried to a point outwardly beyond the line drawn between the centers of the pin 17 and bolt 13, as shown in Fig. 6, the spring 28 then acting to continue said movement and thus cause reëngagement of the pawl lever 16 with a tooth of the ratchet 7, as soon as it is in position therefor. If the pawl and ratchet members of the clutch were not, when disengaged, held out of engagement by the action of the spring 28, the action of the spring 25 would, as the hanger 10 moved forwardly, move the pawl into engagement with each successive tooth of the unmovable ratchet, and, although it would immediately be forced out of such engagement again by the action of the toggle mechanism, the noise and the strain upon the parts would be very objectionable. This objection is, however, avoided, in a measure, by making the outer faces 7ª of the ratchet teeth eccentric, that is to say, by extending outwardly as well as forwardly, that portion of the outer face of each tooth which is in advance of the engaging surface of the tooth, as shown in Figs. 2 to 6, so that as the pawl travels rapidly forward over the teeth, it will, before reaching the engaging surface of each successive tooth, be given an outward thrust which, at least while it is traveling rapidly will cause it to pass beyond the tooth in advance before it can, by the action of the spring 25, be drawn down into position to engage said tooth. While, therefore, I prefer in all cases to employ the spring 28 or an equivalent device for holding the pawl, when once disengaged from the ratchet, free from such engagement until it is again desired to reëngage the same, my invention, in its broader embodiment, is not limited thereto.

The hanger 10 constitutes, in connection with the driving and driven members of the device, a third member, free to move independently of both the driving and driven members, being prevented from moving forwardly with the driving member when the forward movement of the driven member is obstructed and the pawl and ratchet members of the clutch are still in engagement with one another, being also free to move independently of both members when the toggle straightens on the release of the pawl from engagement with the ratchet, and being thereafter free to rotate with the driving member until the clutch members are again engaged. It is immaterial to my invention whether the ratchet 7 is connected to the driving or driven member of the power transmission mechanism, so long as said ratchet is connected to one of said members and the toggle mechanism to the other.

I claim:

1. The combination of the driving and driven members of a power transmission device, a third member free to move independently of both of them, a clutch comprising positively engaging members, one carried by one of said first two members and the other by the third member, a toggle connection between the other of said first two members and that member of the clutch which is carried by the third member, and yielding means whereby said toggle mechanism is caused to retain the clutch members in engaging position.

2. The combination of the driving and driven members of a power transmission device, a pawl and ratchet clutch interposed between them and having its ratchet connected to one of said members, a toggle connection between the other member and the clutch pawl and yielding means whereby said toggle mechanism is caused to retain the pawl in engagement with said ratchet.

3. The combination of the driving and driven members of a power transmission device, a third member movable independently of both of them, a pawl and ratchet clutch having the ratchet connected to one of the first two of said members and the pawl mounted upon the third member, toggle mechanism whereby said pawl is connected to that one of the first two members other than the one which carries the ratchet and yielding means whereby said toggle mechanism is caused to retain the pawl in engagement with said ratchet.

4. The combination of the driving and driven members of a power transmission device, a third member free to move independently of both of them, a ratchet connected to one of the first two of said members, toggle mechanism connecting the other of said first two members to said third member, one of the elements of said toggle mechanism being a lever pivoted to the third member and carrying the pawl for engaging said ratchet and yielding means whereby said toggle mechanism is caused to retain the pawl in engagement with said ratchet.

5. The combination of the driving and driven members of a power transmission device, a third member movable independently of both of them, a ratchet connected to one of the first of said two members, a toggle connection between the other of said first two members and the third member, said toggle connection comprising a link pivoted to said other of the first two members, a lever pivoted to said link, a second lever pivoted to the first lever and also to said third member, said second lever having a pawl for engaging the ratchet, and a spring acting upon said first lever and tending to hold the toggle members in such relation to each other as to cause said toggle to transmit power to the third member.

6. The combination of the driving and driven members of a power transmission device, a third member movable independently of both of them, a ratchet carried by one of said first two members, toggle mechanism connecting the other of said first two members to the third member, said toggle mechanism comprising a pivoted link, a lever fulcrumed thereon, another lever pivoted to the first, fulcrumed upon the third member, and having a pawl for engaging the ratchet, a spring acting to cause said toggle mechanism to maintain said pawl in engagement with said ratchet, and a second spring interposed between said third member and the lever which is pivoted to the link and serving to draw said third member and link toward each other.

7. The combination of the driving and driven members of a power transmission device, a third member movable independently of both of them, a ratchet carried by one of said first two members, toggle mechanism connecting the other of said first two members to the third member, said toggle mechanism comprising a pivoted link, a lever fulcrumed thereon, a second lever fulcrumed upon the third member and having a pawl for engaging the ratchet, a pivotal connection between the two levers, yielding means whereby said toggle mechanism is caused to retain the pawl and ratchet in engagement with one another, and a stop for limiting the outward movement of the link on the breaking of the toggle.

8. The combination of the driving and driven members of a power transmission device, a third member movable independently of both of them, a ratchet carried by one of said first two members, toggle mechanism interposed between the other of said first two members and the third member, said toggle mechanism having as one of its elements a lever pivoted to said third member and having a pawl for engaging the ratchet, and yielding means whereby said toggle mechanism is caused to retain the pawl and ratchet in engaging position, said third member having a stop for arresting the movement of the pawl lever when the pawl is disengaged from the ratchet.

9. The combination of the engaging members of a pawl and ratchet clutch, and means for disengaging them when the forward movement of the driven member is arrested, the outer faces of the teeth of said ratchet projecting both forwardly and outwardly from the outer edges of the engaging faces of the teeth.

10. The combination of the engaging members of a pawl and ratchet clutch, with means for normally holding them in engagement, and means for disengaging them when the forward movement of the driven member is arrested, the outer faces of the teeth of the ratchet projecting both forwardly and outwardly from the outer edges of the engaging faces of the teeth.

In testimony whereof, I have signed my name to this specification, in the presence of two subscribing witnesses.

LELAND WILLIS.

Witnesses:
T. W. McWHORTER,
J. P. CRANSTON.